United States Patent Office 3,322,739
Patented May 30, 1967

3,322,739
NUCLEATED POLYMERS
Hugh J. Hagemeyer, Jr., and William A. Ames, Longview, Tex., assignors to Eastman Kodak Company, Rochester, N.Y., a corporation of New Jersey
No Drawing. Filed Mar. 20, 1964, Ser. No. 353,606
14 Claims. (Cl. 260—88.2)

This invention relates to polymeric compositions exhibiting improved physical properties. More particularly, this invention relates to polyolefin compositions containing nucleating agents which significantly increase the rate of crystallization of a polymer from the melt and also the temperature at which crystallization is complete. In a specific aspect, this invention relates to novel polyolefin compositions containing hydrocarbyloxy aluminum salts of aromatic carboxylic acids.

It is known that articles prepared from olefin polymers such as polyethylene and polypropylene, exhibit a number of outstanding physical properties. Films prepared from such materials are particularly useful as packaging and wrapping materials due to their high tensile strength, stiffness, etc. However, these polymers are generally hazy when formed into films and other articles. This is particularly disadvantageous in packaging fields where the contents of the package should be observed or where the olefin polymer is used in forming other articles such as graduated cylinders, bottles and syringes which necessitate accurate readings of volumes contained therein.

The haziness of articles prepared from olefin polymers is apparently due to the formation of large crystalline aggregates or spherulites which form when the molten polymer is cooled. Such aggregates reflect and scatter light, which destroys visibility through sheets and even thin films, plates, or other articles prepared from the polymers. A number of methods have been proposed for eliminating this difficulty, including the addition of many different nucleating agents to olefin polymers. Nucleating agents which have been used are siliceous in nature, such as modified silicas and silicates. Other solids which have been employed include calcium chloride, potassium bromide, ammonium perfluoroheptane carboxylate, aluminum trichloride, aluminum acetate, sodium sulfate, lithium-12-hydroxystearate, p-terbutylbenzoic acid, and the like.

The nucleating agents employed in the past will often improve the optical properties of film but these additives generally downgrade the other physical properties of the polymer. For example, improved clarity in prior art products is generally accomplished by a decrease in toughness which is, of course, undesirable in films to be used in packaging. In addition, many of these additives are effective only if they have very small particle sizes, for example, smaller than one micron, which requires excessive milling operations.

It is obvious, therefore, that the state of the art will be greatly enhanced by providing olefin polymer compositinos which exhibit good clarity when formed into films and other articles while still exhibiting other physical properties which are as good or better than the base polymer.

It is accordingly an object of this invention to provide novel polymeric compositions exhibiting improved physical properties, particularly clarity.

Another object of this invention is to provide an olefin polymer composition having improved clarity and transparency when formed into films, plates and thin gauge molded articles.

Another object of this invention is to provide a novel nucleating agent for use in polyolefin compositions.

Another object of this invention is to provide novel nucleating agents which give truly outstanding results in comparison to prior art nucleating agents and which are not subject to the disadvantages characteristic of prior art nucleating agents.

Still another object of this invention is to provide a novel nucleating agent which can be employed to improve the clarity of films and other articles prepared from polyolefin compositions without any material downgrading of their other excellent physical properties.

It is another object of this invention to provide novel nucleating agents which improve clarity in addition to other physical properties such as stiffness in flexure and tensile strength.

Further objects and advantages of this invention will be apparent to those skilled in the art from an examination of the examples and claims that follow.

In accordance with this invention, it has been found that articles exhibiting outstanding clarity can be formed from blends of normally solid crystallizable hydrocarbon polymers of olefins containing about .15 to about 2 percent, by weight, of a compound having the formula:

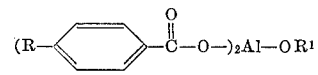

where R is a saturated hydrocarbon radical containing up to 18 carbon atoms and $R^1$ is a saturated hydrocarbon radical containing up to 6 carbon atoms.

The hydrocarbyloxy aluminum carboxylates of this invention are extremely effective nucleating agents in polymers such as polypropylene which are crystallizable. Thus, a dispersion of a small quantity, substantially less than 1%, by weight, of such an aluminum compound in a resin produces a product with greatly improved clarity compared to the base resin. Furthermore, these additives are so effective that the extremely small particle size required for many prior art nucleating agents is not necessary. This is, of course, a distinct advantage in that exhaustive milling operations required heretofore can be eliminated. In addition, the novel nucleating agents of this invention are easily dispersed in polyolefins while prior art nucleating agents such as salts of inorganic acids, metal oxides and non-metal oxides are very difficult to disperse in polyolefins.

In practicing this invention, the hydroxycarbyloxy aluminum salts of aromatic carboxylic acids can be incorporated into any normally solid crystallizable hydrocarbon polymer of an olefin to improve its rate of crystallization from a liquid to a solid phase and also to increase the temperature at which crystallization is complete. These resins are polymers of ethylenically unsaturated hydrocarbons, including homo and copolymers of polymerizable hydrocarbons containing at least one —CH=C< group, or more particularly, a $CH_2$=C< group. These resins are normally solid, crystalline polymers, can be used alone or in admixture in practicing the invention, and can be formed from monomers represented by the formula $CH_2$=$CRR_1$ where R is hydrogen or a hydrocarbon radical, preferably aliphatic or aromatic containing up to 20 carbon atoms, and $R_1$ is hydrogen or a lower alkyl group such as methyl. The preferred R radicals are alkyl radicals containing 1–8 carbon atoms. Although any of the aforementioned polymers can be employed in the practice of this invention, it has been found that the most suitable are hydrocarbon polymers of one of the polymerizable aliphatic α-monoolefins containing 2–10 carbon atoms, desirably 2–6 carbon atoms. Where copolymers are employed in the practice of the invention, very good results are obtained with copolymers containing at least 50%, by weight, and more preferably 80%, by weight, of one or more of the aliphatic α-monoolefins containing 2–10

following examples is determined by heating a sample of the nucleated polymer on a microscope slide above the melting point of the polymer. The slide is then transferred to a hot-stage microscope. The temperature of the hot-stage is allowed to cool at the rate of 5 or 6° C. per minute and the sample is observed continuously under polarized light at 100 times magnification. The temperature expressed in degrees centigrade at which spherulite formations become visible is taken as the recrystallization temperature. The temperature at which the appearance no longer changes is taken as the temperature of complete recrystallization.

The "Clarity" reported in the following examples is that distance at which grid lines 1/16 inch wide on a white background are clearly visible when viewed through compression-molded plates of 0.075 inch thickness when the plate is held 12 inches from an observer's eye. The clarity rating, expressed in inches, is the average of three determinations of the farthest distance at which the grid lines are clearly visible.

This invention can be further illustrated by the following examples of preferred embodiments thereof although it will be understood that these examples are included merely for purposes of illustration and are not intended to limit the scope of the invention unless otherwise specifically indicated.

Example 1

21 g. of aluminum methoxide is added to a 2-liter, 3-neck, round-bottom flask containing one liter of dry xylene and 60 g. of p-tert-butylbenzoic acid. Methanol by-product and excess xylene are removed by distillation. The gray solid is isolated by filtration and dried. The methoxy aluminum di-(p-tert-butylbenzoate) thus obtained is ball milled until the particle size is less than 100 microns.

15 g. of the methoxy aluminum di-(p-tert-butylbenzoate) obtained in the above procedure is blended with 285 g. of polypropylene resin having an inherent viscosity in tetralin at 145° C. of 1.55 in a Banbury mill. This concentrate is let down in 2.7 kg. of polypropylene (Tenite 4232, polypropylene resin manufactured by Texas Eastman Company, a division of Eastman Kodak Company). The blend is granulated, extruded through a homogenizing extruder and formed into pellets.

As already indicated, prior art nucleating agents do not give compositions having the improved combination of properties characteristic of the compositions of this invention. To illustrate, the same polypropylene is blended with 0.5 percent of silicon dioxide, calcium carbonate, alumina, potassium bromide, and sodium sulfate. In addition, a control sample of the same polypropylene is subjected to the same treatment but no nucleating agent is added. The physical properties of injection molded samples as well as clarity and recrystallization data are set forth in the following table.

TABLE I

| Properties | Control | Silicon Dioxide | Calcium Carbonate | Alumina | Potassium Bromide | Sodium Sulfate | Methoxy Aluminum Di-(p-tert-butylbenzoate) |
|---|---|---|---|---|---|---|---|
| Percent concentration | 0 | 0.5 | 0.5 | 0.5 | 0.5 | 0.5 | 0.5 |
| Flow rate at 230° C and 2,160 g. load (ASTM D1238) | 4.39 | 4.30 | 4.34 | 3.82 | 4.31 | 4.27 | 3.53 |
| Density, g./ml. (ASTM D1505-57T) | 0.9101 | 0.9106 | 0.9103 | 0.9109 | 0.9104 | 0.9109 | 0.9111 |
| Inherent Viscosity in Tetralin at 145° C. (0.25% concentration) | 1.55 | 1.55 | 1.55 | 1.55 | 1.54 | 1.55 | 1.55 |
| Tensile Strength at 2"/min., p.s.i.: | | | | | | | |
| At Fracture | 2,950 | 2,900 | 3,020 | 3,150 | 2,950 | 3,100 | 3,670 |
| At Yield | 4,830 | 4,800 | 4,910 | 4,970 | 4,840 | 4,940 | 5,040 |
| Stiffness in Flexure, p.s.i. | 170,200 | 168,300 | 175,000 | 182,000 | 173,300 | 179,600 | 191,300 |
| Vicat Softening Point, °C | 150 | 148 | 149 | 150 | 150 | 150 | 150 |
| Hardness, Rockwell R Scale | 97 | 98 | 98 | 99 | 97 | 97 | 98 |
| Tensile Impact Strength (ASTM D1822-61T) | 31.3 | 31.3 | 31.5 | 31.9 | 31.3 | 31.5 | 33.1 |
| Recrystallization Temperature, °C | 130 | 132 | 133 | 137 | 133 | 135 | 140 |
| Clarity, Inches | 2 | 112 | 53 | 150 | 107 | 68 | 310 |

It can be seen from the above table that the nucleated polypropylene of this invention exhibits significantly improved clarity in comparison to polypropylene nucleated with prior art materials. When other crystallizable polymers such as ethylene propylene copolymers, polystyrene, polybutene, polycyclohexene and polyallylbenzene are substituted for polypropylene in the above procedure a like improvement in physical properties, particularly clarity, is obtained.

Example 2

Isopropoxy aluminum di-(p-tert-butylbenzoate) is prepared using the procedure of Example 1. A concentrate of 15 g. of this nucleating agent and 285 g. of polypropylene (inherent viscosity in tetralin at 145° C. of 1.20) is prepared by Banbury milling. The concentrate is granulated and dry blended with 2.7 kg. of polypropylene resin (inherent viscosity 1.55, Vicat softening 149° C. density 0.9100). The blend was extruded in a homogenizing extruder. The same polypropylene is subjected to similar treatment using 0.50 percent of lithium isobutyrate, aluminum chloride, aluminum acetate, sodium hydrogen phosphate, and lithium-12-hydroxystearate, which are known prior art nucleating agents. A control sample is also subjected to similar treatment. Injection-molded physical properties, clarity ratings, and the recrystallization temperature are reported in the following table.

TABLE II

| Properties | Control | Lithium Isobutyrate | Aluminum Chloride | Aluminum Acetate | Sodium Hydrogen Phosphate | Lithium 12-hydroxy Stearate | Isopropoxy Aluminum Di-(p-tert-butylbenzoate) |
|---|---|---|---|---|---|---|---|
| Percent concentration | 0 | 0.5 | 0.5 | 0.5 | 0.5 | 0.5 | 0.5 |
| Flow Rate at 230° C. and 2,160 g. Load (ASTM D-1238) | 4.39 | 4.30 | 4.35 | 4.15 | 4.33 | 3.95 | 3.63 |
| Density, g./ml. (ASTM D1505-57T) | 0.9100 | 0.9102 | 0.9105 | 9.0103 | 0.9103 | 0.9112 | 0.9109 |
| Inherent Viscosity in Tetralin at 145° C | 1.55 | 1.55 | 1.55 | 1.55 | 1.55 | 1.55 | 1.55 |
| Tensile Strength at 2"/min., p.s.i.: | | | | | | | |
| At Fracture | 2,950 | 2,980 | 2,970 | 3,030 | 2,980 | 3,590 | 3,690 |
| At Yield | 4,810 | 4,830 | 4,810 | 4,840 | 4,820 | 4,930 | 5,050 |
| Stiffness in Flexure, p.s.i. | 171,100 | 173,300 | 173,100 | 176,600 | 174,700 | 183,400 | 190,200 |
| Vicat Softening Point, °C | 149 | 150 | 150 | 150 | 150 | 150 | 150 |
| Hardness, Rockwell R Scale | 97 | 97 | 97 | 97 | 98 | 98 | 99 |
| Tensile Impact Strength (ASTM D1822-61T) | 31.1 | 31.1 | 31.1 | 32.2 | 31.3 | 33.0 | 33.1 |
| Recrystallization Temperature, °C | 131 | 133 | 133 | 135 | 133 | 137 | 139 |
| Clarity, Inches | 2 | 96 | 78 | 185 | 103 | 213 | 293 |

Example 3

A concentrate of 30 g. of isopropoxy aluminum di-(p-methylbenzoate) and 270 g. of polypropylene resin (inherent viscosity 1.55) is prepared by blending on hot mill rolls for 10 minutes. The concentrate is granulated and dry blended with 5.7 kg. of polypropylene resin (inherent viscosity 1.55, Vicat softening 150° C., density 0.9100). The resulting blend is extruded in a homogenizing extruder. Polypropylene of the same type is subjected to similar treatment using 0.5 percent of sodium chloride, aluminum citrate, aluminum propionate, potassium nitrate, and aluminum methoxide. Injection-molded physical properties, clarity ratings, and recrystallization temperatures for these compositions and control sample are presented in the following table.

Injection-molded physical properties, recrystallization temperature, and clarity rating for this sample are recorded in the following table.

The same polypropylene was blended with 0.5 percent of the following nucleating agents: isobutoxy aluminum di - (p-tert - butylbenzoate), isobutoxy aluminum di-(p-methylbenzoate), ethoxy aluminum di-(p-methylbenzoate), aluminum tri(p-tert-butylbenzoate), and p-tert-butylbenzoic acid. Properties for these samples are set forth in the following table.

TABLE IV

| Properties | Control | p-tert-Butyl-benzoic Acid | Aluminum tri(p-tert-Butylbenzoate) | Isobutoxy Aluminum Di-(p-methylbenzoate) | Isobutoxy Aluminum Di-(p-tert-Butylbenzoate) | Ethoxy Aluminum Di-(p-methylbenzoate) | Ethoxy Aluminum Di-(p-tert-Butylbenzoate) |
|---|---|---|---|---|---|---|---|
| Percent concentration | 0 | 0.5 | 0.5 | 0.5 | 0.5 | 0.5 | 0.5 |
| Flow Rate at 230° C. and 2,160 g. Load (ASTM D1238) | 4.37 | 4.35 | 4.12 | 3.92 | 3.80 | 3.95 | 3.70 |
| Density, g./ml. (ASTM D1505-57T) | 0.9101 | 0.9101 | 0.9105 | 0.9103 | 0.9108 | 0.9112 | 0.9107 |
| Inherent Viscosity in Tetralin at 145° C | 1.55 | 1.55 | 1.55 | 1.55 | 1.55 | 1.55 | 1.55 |
| Tensile Strength at 2″/min., p.s.i.: | | | | | | | |
| At Fracture | 2,930 | 2,925 | 3,320 | 3,620 | 3,650 | 3,620 | 3,640 |
| At Yield | 4,820 | 4,820 | 4,890 | 5,010 | 5,020 | 5,000 | 5,015 |
| Stiffness in Flexure, p.s.i. | 169,300 | 169,600 | 182,300 | 187,900 | 188,300 | 185,700 | 189,500 |
| Vicat Softening Point, ° C | 150 | 150 | 150 | 151 | 150 | 150 | 150 |
| Hardness, Rockwell R Scale | 97 | 97 | 98 | 99 | 98 | 98 | 97 |
| Tensile Impact Strength (ASTM D1822-61T) | 31.0 | 31.2 | 32.2 | 32.8 | 33.0 | 32.7 | 32.9 |
| Recrystallization Temperature, ° C | 130 | 130 | 136 | 138 | 138 | 136 | 139 |
| Clarity, Inches | 2 | 2 | 213 | 273 | 298 | 284 | 303 |

Example 5

As already indicated, the physical properties, particularly tensile strength, stiffness in flexure and recrystallization temperature, of solid crystallizable hydrocarbon polymers can be improved by the incorporation of the novel nucleating agents of this invention. To illustrate, the procedure of Example 1 is repeated with an ethylene-propylene butadiene copolymer; a propylene butene-1 block copolymer containing 3.5%, by weight, butene-1; polybutene; a propylene hexene-1 block copolymer containing 8%, by weight, hexene-1 and an ethylene butene-1 block copolymer containing 4.7%, by weight, ethylene. The results are set forth in the following table.

TABLE III

| Properties | Control | Sodium Chloride | Aluminum Citrate | Aluminum Propionate | Potassium Nitrate | Aluminum Methoxide | Isopropoxy Aluminum Di-(p-methylbenzoate) |
|---|---|---|---|---|---|---|---|
| Percent concentration | 0 | 0.5 | 0.5 | 0.5 | 0.5 | 0.5 | 0.5 |
| Flow Rate at 230° C and 2,160 g. Load (ASTM D1238) | 4.35 | 4.30 | 4.10 | 4.00 | 4.28 | 4.33 | 3.65 |
| Density, g./ml (ASTM D1505-57T) | 0.9101 | 0.9107 | 0.9109 | 0.9111 | 0.9103 | 0.9107 | 0.9108 |
| Inherent Viscosity in Tetralin at 145° C | 1.55 | 1.55 | 1.55 | 1.55 | 1.55 | 1.55 | 1.55 |
| Tensile Strength at 2″/min., p.s.i.: | | | | | | | |
| At Fracture | 2,940 | 2,940 | 2,960 | 2,960 | 2,940 | 2,930 | 3,660 |
| At Yield | 4,830 | 4,840 | 4,870 | 4,850 | 4,840 | 4,810 | 5,030 |
| Stiffness in Flexure, psi | 170,300 | 172,300 | 180,100 | 181,300 | 171,100 | 170,500 | 187,600 |
| Vicat Softening Point, ° C | 150 | 150 | 150 | 150 | 150 | 150 | 150 |
| Hardness, Rockwell R Scale | 97 | 97 | 98 | 98 | 97 | 97 | 99 |
| Tensile Impact Strength (ASTM D1822-61T) | 31.2 | 31.3 | 31.8 | 31.8 | 31.2 | 31.1 | 33.0 |
| Recrystallization Temperature, ° C | 131 | 131 | 136 | 136 | 132 | 131 | 138 |
| Clarity, Inches | 2 | 33 | 95 | 184 | 87 | 30 | 270 |

Example 4

30 g. of ethoxy aluminum di-(p-tert-butylbenzoate) is blended with 270 g. of polypropylene (inherent viscosity 1.55) in a Banbury mill. The resulting concentrate is granulated and dry blended with 5.7 kg. of polypropylene resin (inherent viscosity 1.55, Vicat softening 150° C., density 0.9100). The blend is extruded and pelletized.

TABLE V

| Polymer | Flow Rate at 230° C. and 2,160 g. Load (ASTM D1238). | Inherent Viscosity in Tetralin at 145° C. | Tensile Strength at 2"/min. p.s.i. | Stiffness in Flexure, p.s.i. | Recrystallization Temperature, ° C. |
|---|---|---|---|---|---|
| Ethylene Propylene Butadiene Copolymer (60/38/2 weight ratio, I.V. 1.7, Vicat Softening 142° C., Density 0.9120): | | | | | |
| Base resin | 2.5 | 1.7 | 3,200 | 86,000 | 128 |
| Nucleated Resin | 2.35 | 1.7 | 3,450 | 102,000 | 138 |
| Propylene Butene-1 block copolymer (3.5% butene-1, I.V. 1.5 Vicat Softening 145°, Density 0.9071): | | | | | |
| Base resin | 4.2 | 1.5 | 2,700 | 66,500 | 126 |
| Nucleated Resin | 4.0 | 1.5 | 2,950 | 81,000 | 135 |
| Polybutene (I.V. 1.9 Vicat Softening 44° C., Density 0.9056): | | | | | |
| Base resin | 0.5 | 1.9 | 3,600 | 18,200 | <70 |
| Nucleated Resin | 0.5 | 1.9 | 3,750 | 24,700 | <70 |
| Propylene Hexene-1 block copolymer (8% hexene-1, I.V. 1.7 Vicat Softening 134° C., Density 0.9050): | | | | | |
| Base Resin | 3.5 | 1.7 | 3,980 | 110,000 | 126 |
| Nucleated Resin | 3.5 | 1.7 | 4,200 | 124,000 | 137 |
| Ethylene Butene-1 block copolymer (4.7% ethylene, I.V. 1.0 Vicat Softening 124° C., Density) 0.9510: | | | | | |
| Base Resin | 1.0 | 2.0 | 2,660 | 61,000 | 78 |
| Nucleated Resin | 0.9 | 2.0 | 2,800 | 74,500 | 82 |

Thus, by the practice of this invention, it is possible to improve the clarity of articles prepared from solid, crystallizable hydrocarbon polymers without materially down-grading their other physical properties. In fact, a number of these other physical properties are substantially improved by the incorporation of the novel nucleating agents disclosed herein. The nucleated compositions prepared according to the invention can be used in the preparation of the same films, fibers, plates or the like articles in which the non-nucleated polymers are used except that such articles will exhibit significantly improved clarity. This is particularly desirable in the film and packaging fields. In addition, the compositions disclosed herein give improved release from rolls in film, casting, easier release from complex molds, improved surface finish of molded articles and improved non-blocking properties.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A composition comprising a normally solid component comprising crystallizable homo- or copolymers of olefins and about .15 to about 2%, by weight, of a compound having the formula:

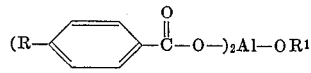

where R is a saturated hydrocarbon radical containing up to 18 carbon atoms and R¹ is a saturated hydrocarbon radical containing up to 6 carbon atoms.

2. A composition comprising a normally solid component comprising crystallizable homo- or copolymers of olefins, and about .2 to about .6%, by weight, of a compound having the formula:

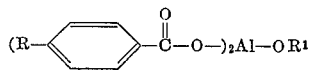

where R is a saturated hydrocarbon radical containing up to 18 carbon atoms and R¹ is a saturated hydrocarbon radical containing up to 6 carbon atoms.

3. The composition of claim 2 in which R is an alkyl radical containing 4–18 carbon atoms and R¹ is an alkyl radical containing 1–4 carbon atoms.

4. The composition of claim 1 in which the normally solid crystallizable hydrocarbon polymer is polyethylene.

5. The composition of claim 1 in which the normally solid crystallizable hydrocarbon polymer is polypropylene.

6. A composition comprising a normally solid crystallizable propylene-butene copolymer having an inherent viscosity in tetralin at 145° C. in the range of about .25 to about .5 and about .15 to about 2%, by weight, of a compound having the formula:

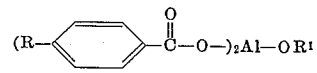

where R is an alkyl radical containing 4–18 carbon atoms and R¹ is an alkyl radical containing 1–4 carbon atoms.

7. A composition comprising a normally solid crystallizable polypropylene and about .15 to about 2%, by weight, of methoxy aluminum di-(p-tert-butylbenzoate).

8. A composition comprising a normally solid crystallizable propylene-butene copolymer and about .15 to about 2%, by weight, of methoxy aluminum di-(p-tert-butylbenzoate).

9. A composition comprising a normally solid crystallizable polyethylene and about .15 to about 2%, by weight, of methoxy aluminum di-(p-tert-butylbenzoate).

10. A compound having the formula:

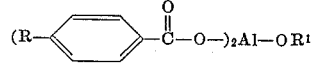

where R is a saturated hydrocarbon radical containing up to 18 carbon atoms and R¹ is a saturated hydrocarbon radical containing up to 6 carbon atoms.

11. The compound of claim 10 in which R is an alkyl radical containing 4–18 carbon atoms and R¹ is an alkyl radical containing 1–4 carbon atoms.

12. Methoxy aluminum di-(p-tert-butylbenzoate).
13. Isopropoxy aluminum di-(p-tert-butylbenzoate).
14. Isobutoxy aluminum di-(p-tert-butylbenzoate).

No references cited.

JOSEPH L. SCHOFER, *Primary Examiner.*

L. EDELMAN, *Assistant Examiner.*